United States Patent [19]
Weisser et al.

[11] Patent Number: 5,530,941
[45] Date of Patent: Jun. 25, 1996

[54] SYSTEM AND METHOD FOR PREFETCHING DATA FROM A MAIN COMPUTER MEMORY INTO A CACHE MEMORY

[75] Inventors: Pirmin L. Weisser, Unterkirnach, Germany; Fulps V. Vermeer, Delft, Netherlands; Edward C. King, Fremont, Calif.

[73] Assignee: NCR Corporation, Dayton, Ohio

[21] Appl. No.: 563,215

[22] Filed: Aug. 6, 1990

[51] Int. Cl.[6] ............................................. G06F 13/28
[52] U.S. Cl. ................................. 395/478; 395/287
[58] Field of Search ............................. 364/200, 900; 395/400, 425

[56] References Cited

U.S. PATENT DOCUMENTS

| | | | |
|---|---|---|---|
| 4,442,484 | 4/1984 | Childs, Jr. et al. | 395/425 |
| 4,490,782 | 12/1984 | Dixon et al. | 364/200 |
| 4,527,237 | 7/1985 | Frieder et al. | 364/200 |
| 4,622,631 | 11/1986 | Frank et al. | 364/200 |
| 4,719,568 | 1/1988 | Carrubba et al. | 364/200 |
| 4,823,259 | 4/1989 | Aichelmann, Jr. et al. | 395/425 |
| 4,884,197 | 11/1989 | Sachs eet al. | 395/425 |
| 4,914,577 | 3/1990 | Stewart et al. | 364/200 |
| 4,926,317 | 5/1990 | Wallach | 364/200 |
| 4,991,080 | 2/1991 | Emma et al. | 364/200 |
| 5,023,776 | 6/1991 | Gregor | 364/200 |
| 5,025,366 | 6/1991 | Baror | 395/425 |
| 5,055,999 | 10/1991 | Frank et al. | 395/425 |
| 5,113,515 | 5/1992 | Fite et al. | 395/425 |
| 5,136,697 | 8/1992 | Johnson | 395/375 |

*Primary Examiner*—Reba I. Elmore
*Attorney, Agent, or Firm*—Douglas S. Foote

[57] ABSTRACT

A method and system for transferring data elements from a computer main memory to a cache memory. The main and cache memories are accessible by a host processor and other bus masters connected thereto by a bus. Code data elements to be read by the host processor are predicted. The predicted code data elements are then transferred from the main memory to cache memory without delaying memory access requests for data from the other bus masters.

13 Claims, 5 Drawing Sheets

Microfiche Appendix Included
(3 Microfiche, 263 Pages)

SYSTEM AND METHOD FOR PREFETCHING DATA FROM A MAIN COMPUTER MEMORY INTO A CACHE MEMORY

The microfiches are located in the appendix and contains three microfiche and 263 frames.

The present invention relates to computer memory systems. More particularly, it relates to a method and system for prefetching data from a computer memory system.

CROSS-REFERENCE TO RELATED APPLICATIONS

"Computer Memory System", U.S. patent application Ser. No. 563,216, filed concurrently herewith, invented by Edward C. King, Jackson L. Ellis, Robert B. Moussavi and Pirmin L. Weisser.

"Computer Memory Open Page Bias Method and System", U.S. patent application Ser. No. 563,221, filed concurrently herewith, invented by Edward C. King and F. Vincentinus Vermeer.

"Computer Memory System", U.S. patent application Ser. No. 563,214, filed concurrently herewith, invented by Edward C. King, Forrest O. Arnold, Jackson L. Ellis, Robert B. Moussavi, Pirmin L. Weisser and F. Vincentinus Vermeer.

"Method for Merging Data in A Computer Memory System", U.S. patent application Ser. No. 563,219, filed concurrently herewith, invented by Edward C. King, Forrest O. Arnold, Jackson L. Ellis, Robert B. Moussavi, Pirmin L. Weisser and F. Vincentinus Vermeer.

"Computer Memory System and Method for Cleaning Data Elements", U.S. patent application Ser. No. 563,217, filed concurrently herewith, invented by Jackson L. Ellis.

"Mapped Cache Structure and Method", U.S. patent application Ser. No. 563,218, filed concurrently herewith, invented by Robert B. Moussavi and Jackson L. Ellis.

"Computer Memory System and Method for Enhancing Performance on Cache Overflows", U.S. patent application Ser. No 563,220, filed concurrently herewith, invented by Jackson L. Ellis, Robert B. Moussavi and Edward C. King.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer system's main memory. A high speed memory may employ SRAMs for use as a processor cache memory. The theory behind memory hierarchy is to group code (instructions) and other data to be executed by the system processor in the highest speed memory. Since high speed memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

A technique which can influence the hit ratio and improve system performance is the use of a prefetch queue. A prefetch queue is a collection of data elements in a high speed memory which are selected on the basis of a prefetch algorithm. For example, code data elements can be prefetched from the system memory in anticipation of their use by the system processor. In the past, such prefetch queues have been closely associated with the system processor. In systems having multiple bus masters, the prefetch requests for data from the system processor must compete for memory accesses with the other bus masters. Other memory requests will be delayed if the prefetch requests get priority. This somewhat affects system performance by imposing wait states on other bus masters. Moreover, since the prefetch request is merely a guess, some or many of the prefetched data elements may not be used by the processor. System performance is further deteriorated to the extent such unused data elements delayed memory access requests by other bus masters.

OBJECTS OF THE INVENTION

It is therefore an object of the present invention to provide a new and improved method and system for prefetching data from a system memory.

It is another object of the present invention to provide a method for improving the response time of a memory system.

It is a further object of the present invention to provide a method for improving the performance of a computer system.

It is yet another object of the present invention to provide a new and improved memory system.

It is yet a further object of the present invention to provide a more efficient prefetch queue.

It is still another object of the present invention to provide a method and system for accessing code data in a computer memory system.

SUMMARY OF THE INVENTION

One form of the present invention is a method for managing data elements in a memory system. The memory system is accessible by a plurality of bus masters connected by a bus to the system. Code data elements to be read are predicted. The predicted code data elements are then transferred within the memory system from a slow to high speed memory without delaying memory access requests for data from the bus masters.

Another form of the present invention is a memory system, connectable by a bus to a plurality of bus masters. The system includes a system memory, cache, predicting means and transfer means. The memory and cache are connected to the bus. The predicting means predicts data elements to be read by a bus master. The transfer means transfer the predicted data elements from the memory to the cache without delaying memory access requests from the bus masters.

DESCRIPTION OF A PREFERRED EMBODIMENT

Figure 1:
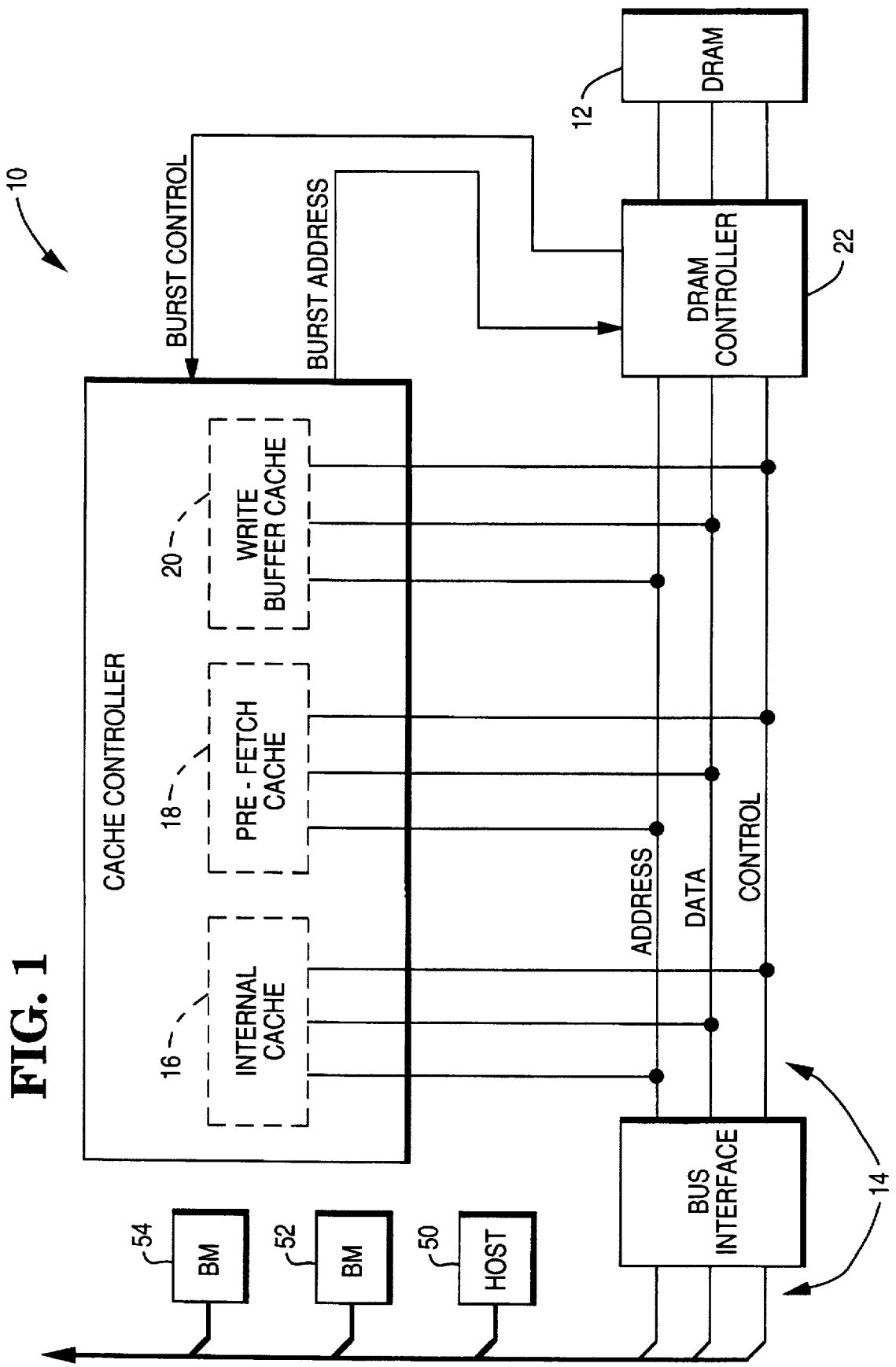
FIG. 1 is a block diagram of a high performance computer memory system.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system by a bus 14. Memory system 10 is designed for use with two or more bus masters, although it is operable with a single master. More particularly, it is designed for use with a host processor 50 such as an Intel processor 386, 386sx or 486 in combination with other bus masters 52, 54 or devices which will compete with the host processor 50 for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4K byte, four-way set associative cache, pre-fetch cache 18 is a 128 byte, direct-mapped cache, and write buffer cache 20 is a 128 byte, two-way set associative cache.

A feature of the caches is that their functionality may be varied depending upon the host processor type (386, 386sx or 486) utilized. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that pre-fetch cache 18 contains solely code data pre-fetched from DRAM 12. As will be described in more detail later, it only pre-fetches code based on a memory access by the host processor. In operation, whenever the system processor requests code data not already in the pre-fetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12.

An important feature of the caches is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, for a system employing a 486 system processor, write buffer cache 20 buffers data writes by any bus master other than the system processor. For a system employing a 386 or 386sx system processor, internal cache 16 holds only code data and is a read only cache for the system processor, and write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. In addition, DRAM 12 is divided into pages which contain either code or non-code data. A register associated with DRAM 12 is located either in DRAM 12 or DRAM controller 22 and holds the page address of a most recently accessed page. In effect, the system provides a bias towards code pages or non-code pages depending upon the type of processor connected to the system. For example, if the system processor is a 486, the address of the most recently accessed code address page is held in the register. In operation, both code and non-code data pages in DRAM 12 can be randomly accessed. If a code page is accessed on one cycle and a non-code page is accessed on the next cycle, the address of the code page is held in a register while the non-code page is accessed. Immediately after the non-code page access, the address in the register is used to reopen the code page. In contrast, if the system processor is a 386 or 386sx, the address of the most recently accessed non-code address page is held in the register. The combination of selective open page bias, fast page mode accesses and multiple caches provides increased system performance.

Write buffer cache 20 is a two-way set associative cache. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping respective blocks to opposing sets in the two-way set associative cache, increased operational efficiency can be realized. Furthermore, an open page bias in the DRAM for non-code data will effectively be an open page bias for list data. In this manner, operational efficiency is further enhanced.

Figure 2A:
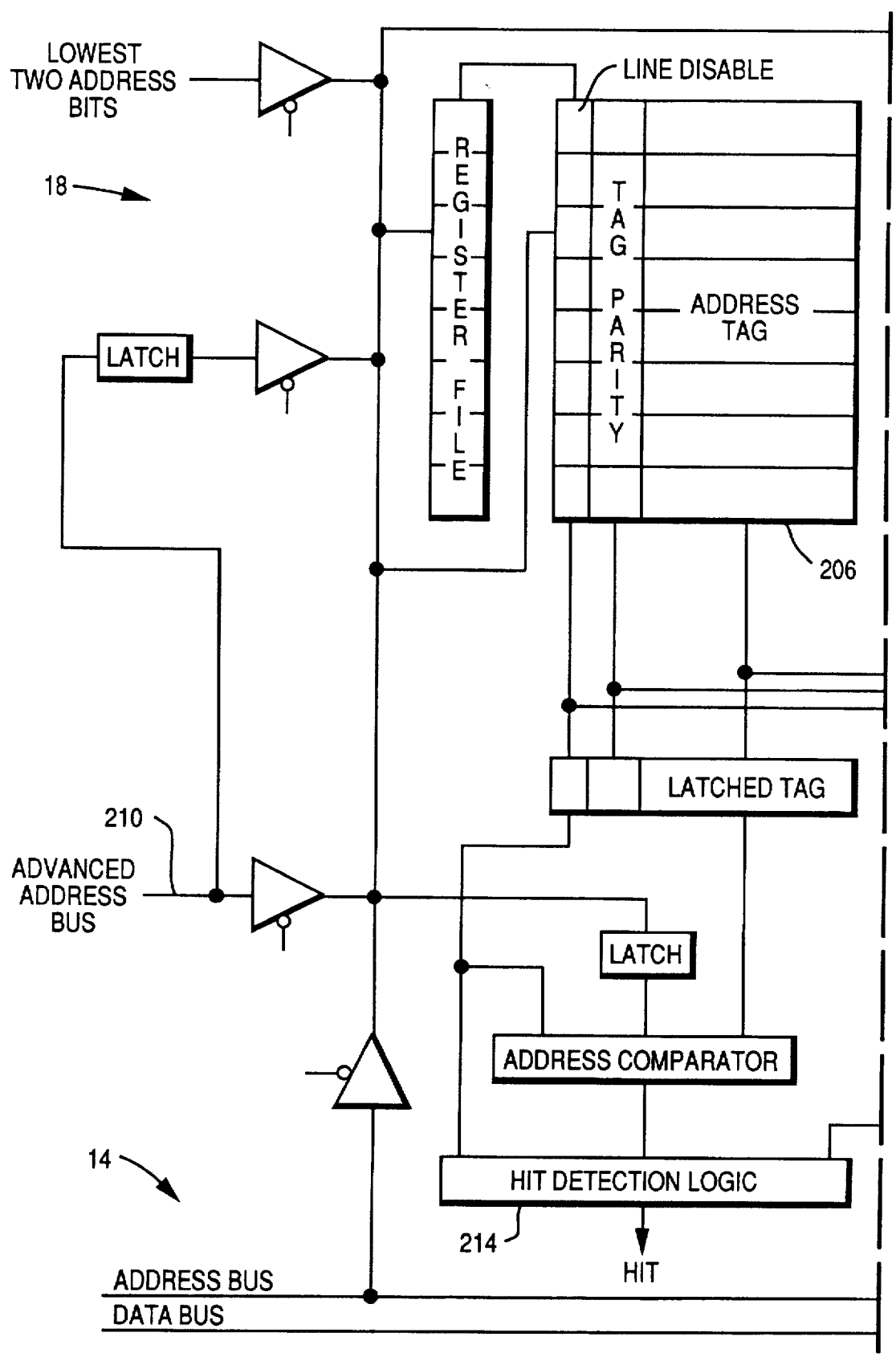
FIGS. 2A and 2B show a block diagram of a prefetch queue according to one form of the present invention.
Figure 2B:
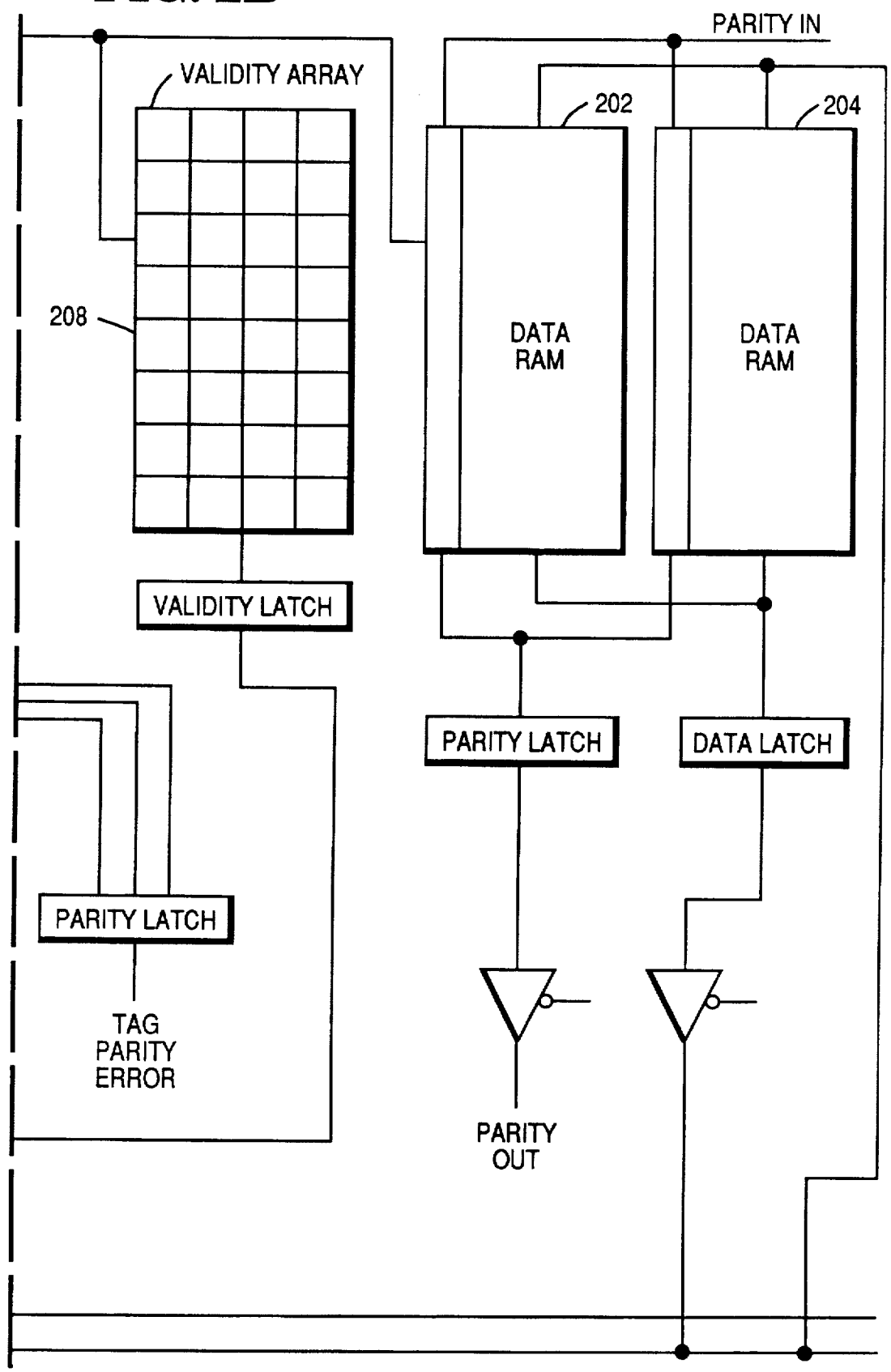

FIGS. 2A and 2B show a diagram of a prefetch queue cache 18 according to one form of the present invention. Cache 18 receives code data elements (double words) from system memory 12 and can only be read, and not written to, by external bus masters. Cache 18 is connected to transaction bus 14 which includes both address and data lines. Cache 18 includes code data RAMs 202 and 204 which combined hold up to 32 double words (32×4 bytes), a tag RAM 206, a validity array 208, and associated control logic. Cache 18 is a direct mapped cache, with an address tag in RAM 206 corresponding to each line of four double words in data RAMs 202 and 204. A cache hit is determined by comparing selected bits for a current address (either from the advanced address bus 210 or transaction bus 14) with an address from tag RAM 206. This comparison is made in hit detection logic 214 which generates a "hit" signal if the current data is in cache 18.

Figure 3:
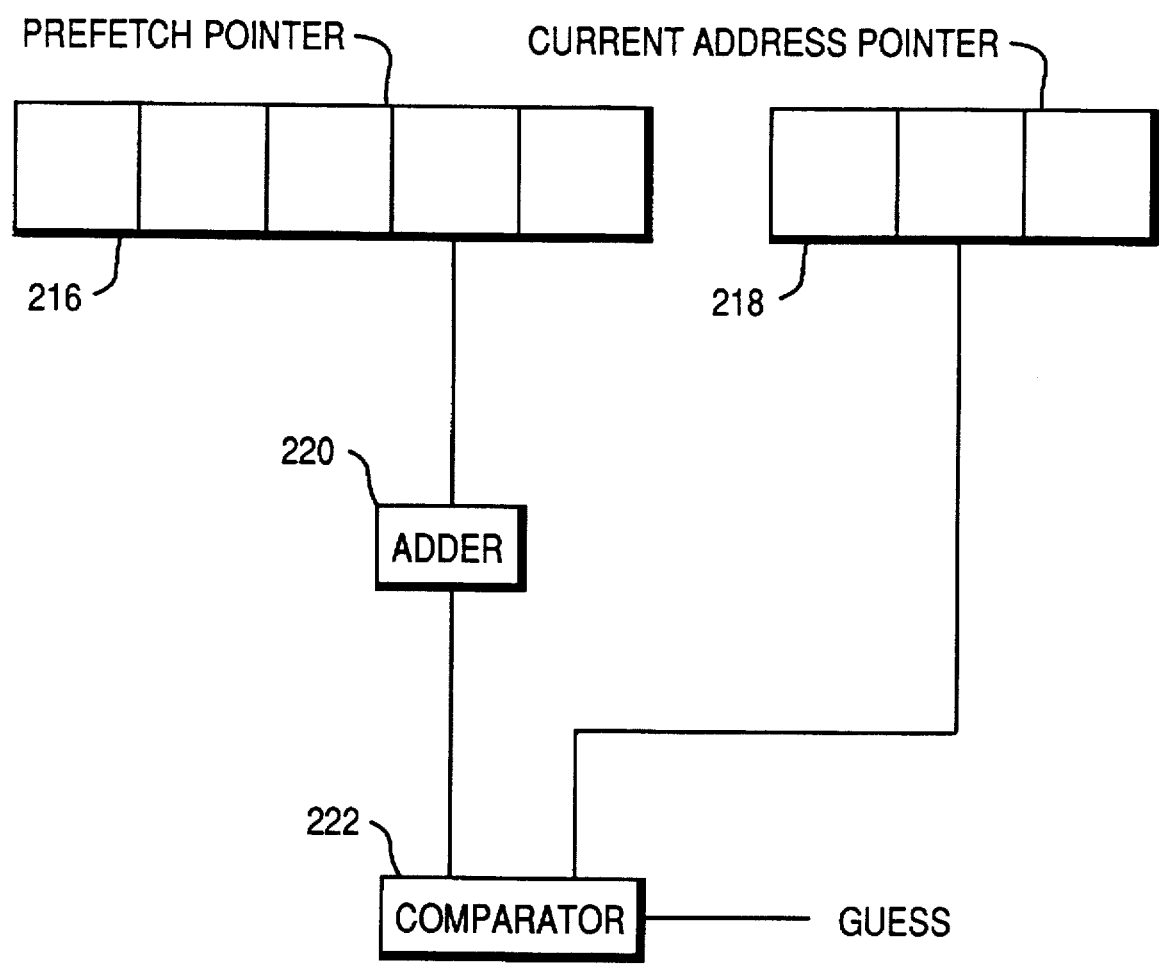
FIG. 3 is a diagram of guess signal generator for use with the prefetch queue of FIGS. 2A and 2B.

FIG. 3 shows a diagram of a structure closely associated with cache 18 for providing a "guess" signal which indicates the availability of storage space in cache 18. A prefetch pointer 216 is a register which stores the address of the most recent data element transferred to cache 18. A current address pointer 218 is a register which stores the address of the most recent data element read from cache 18. The address stored by each register is only part of the full address for each of the respective data elements. The number of bits selected for the current address pointer depends upon the number of locations available in tag RAM 206. For example, if there is a tag address for each data element, and there are 32 data elements, the number of current address bits is 5 ($32^5$). In the embodiment shown, there is a tag address for each data line, each data line holding a plurality of data elements (4×32 bits, i.e., 4 double words). Thus, current address pointer 218 contains address bits 4, 5 and 6 which point to one of eight lines. Prefetch pointer 216 holds address bits 2, 3, 4, 5 and 6 which point to one of 32 data elements in cache 18. Prefetch pointer 216 is connected to an adder 220 which increments the address in prefetch pointer 216 by 1. The outputs of adder 220 and current address pointer 218 are connected as inputs to comparator 222. The output of comparator 222 is the guess signal which is active so long as the two values are not equal. However, when the address in prefetch pointer 216 is one less than the that in current address pointer 218, "guess" is deactivated.

If there is a tag address for each data element and current address pointer 218 specifies individual elements, the address in prefetch pointer 216 will be one less than that in current address pointer 218 every $m^{th}$ address, where m is the number of data elements (double words) in prefetch queue cache 18. The guess signal indicates the availability of storage space in cache 18 whenever prefetch pointer 216 is not one address behind current address pointer 218. If there is a tag address for each data line and current address pointer 218 specifies individual lines, the address in prefetch pointer 216 will be one less than that in current address pointer 218 every $n^{th}$ address, where n is the number of data lines in prefetch queue cache 18. The following discussion assumes there is a tag address for each data element and current address pointer 218 specifies individual elements. However, it will be clear to a person skilled in the art that the discussion applies generally as well to a pointer configuration such as shown in FIG. 3.

Prefetch pointer 216 is loaded with the address of each data element as it is transferred from DRAM 12. Current address pointer 218 is loaded with the address of each data element as it is read from cache 18. If cache 18 is completely full of predicted data elements, the guess signal will be inactive. If the next code data element read by a bus master is the next sequential address to that previously read, current address pointer 218 will be loaded with the next address. Prefetch pointer 216 will now lag current address pointer 218 by two and the guess signal will again be activated to request a new data element to replace the one just read from cache 18. Accordingly, cache 18 is a circular queuing memory. In other words, as long as there is a hit in cache 18 for a code data element requested by a bus master, cache 18 will refill in a continuous manner.

In operation, the method of the present invention may be broadly divided into two steps. First, code data elements to be read are predicted. Second, the predicted code data elements are transferred from DRAM 12 to cache 18 without delaying memory access requests for data from any of the bus masters. However, as will be understood better from the following description, the two steps may somewhat overlap and are generally repeated during operation of the subject computer system on each subsequent code data read request from a bus master.

Initially, prefetch pointer 216 and current address pointer 218 are loaded with values which will provide an active guess signal. One of the bus masters, preferably the host processor, requests a read of a code data element from the memory system. A cache hit will not occur and the requested data element will be read from DRAM 12. In order to identify the next sequential data element, the address of the requested data element is stored in a register in DRAM controller 22. DRAM controller 22 now receives the guess signal and increments the stored address to the address of the next sequential data element. This next sequential data element is transferred to cache 18 whenever transaction bus 14 is free.

There are various techniques that can be employed which involve DRAM controller 22 snooping bus 14 and transmitting the next data element on a free or open cycle. In a preferred embodiment, the memory system is synchronized to a clock cycle. The fastest data reads take two cycles (when there is a cache hit). When a request comes into the bus interface, predetermined address bits get routed directly to the caches over advanced address bus 210 to start a memory access. This occurs in the first period during which period the transaction bus 14 is idle. If there is a cache hit, the data element is placed on transaction bus 14 during the second cycle. Since, bus 14 is open (not used) during the first period, the code data element is transferred to cache 18 during this first period. By transferring the predicted data elements from DRAM 12 to cache 18 during open cycles, a memory access request from a bus master is not delayed. This is an important feature of the present invention because since all data elements in cache 18 are merely estimated, the performance gain of having prefetched code data elements into a cache can be partially offset if cycle time is lost caching the data elements.

The preceding process of incrementing the address in DRAM controller to the address of the next sequential data element, observing the guess signal, monitoring transaction bus 14 and transferring data elements from DRAM 12 to cache 18 on open cycles is repeated as long as there is space in cache 18. Available space in cache 18 is defined as having less than m predicted data elements residing in cache 18, where m is the data element capacity of cache 18. An element is "predicted" at a given point if it is within the set of expected data elements to be read. For example, if cache 18 is filled with the next m sequential data elements, as counted from the previous read, there is no space available. If the next read request is for a code data element not in cache 18, none of the m data elements then in cache 18 are deemed to be "predicted" and the entire space in cache 18 is "available." Whenever a code data element is read by a bus master, irrespective of whether it is in cache 18, there will always be one or more sequential code data elements to be predicted and transferred from DRAM 12 to cache 18, as long as there is a tag address for each data element in cache 18. However, if there is a tag address for each data line, a code read by a bus master will not generate a transfer from DRAM 12 to cache 18 if current address pointer 218 is loaded with the same line address.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 4:
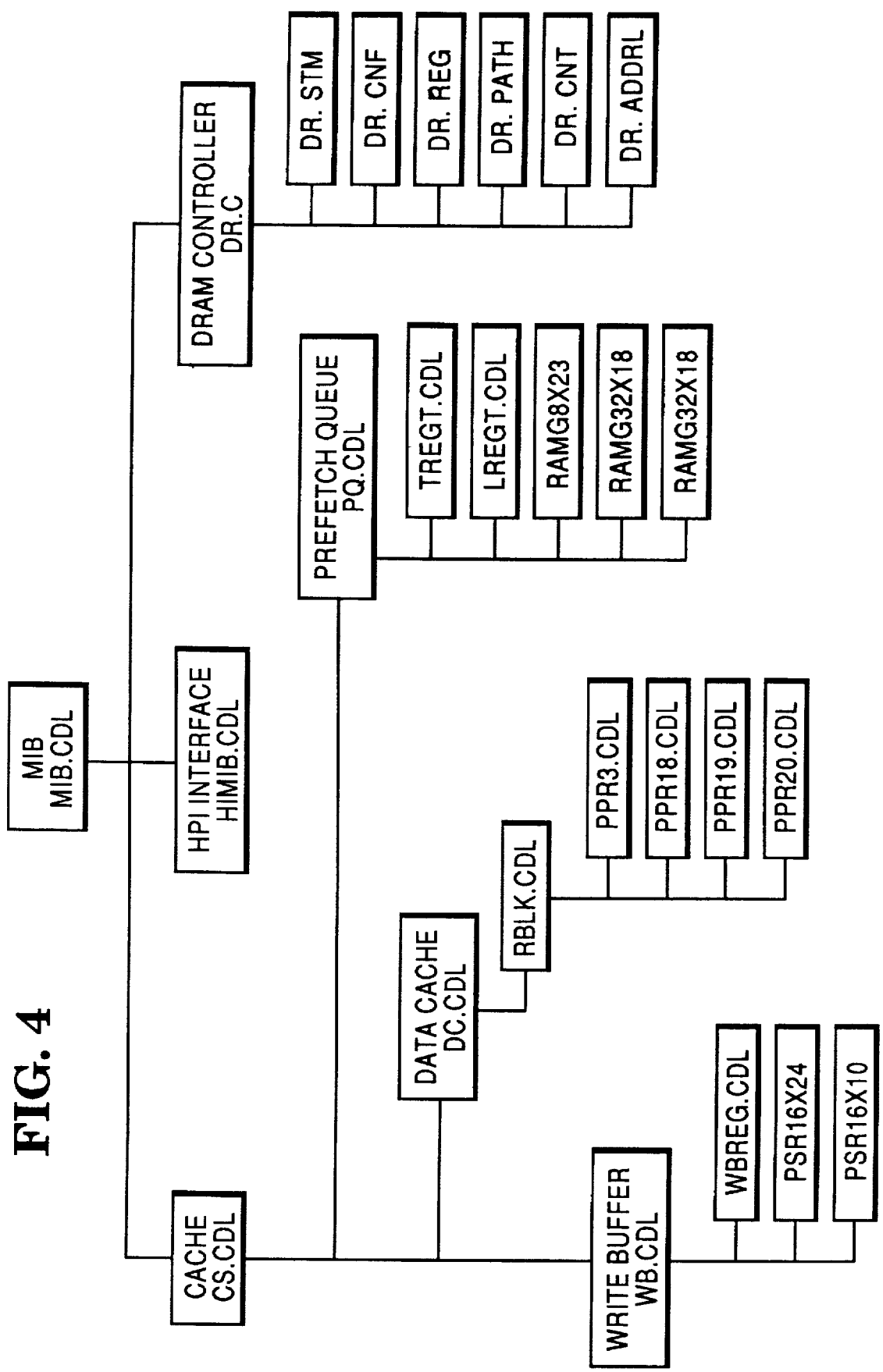
FIG. 4 is a block diagram showing the relationship between modules of the memory system.

FIG. 4 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for managing data elements in a memory system, wherein:

said memory system has first and second memories, said second memory being an addressable high speed cache memory; and said first and second memories are accessible by a plurality of bus masters which are connected by a bus to said memory system, the method comprising the steps:

predicting data elements to be read; and transferring said predicted data elements within said memory system from said first to said second memory only when memory system access requests from said plurality of bus masters will not be delayed.

2. The method of claim 1 wherein said predicting step occurs after a read request from a first of said bus masters.

3. The method of claim 2 wherein said first bus master is a host processor.

4. The method of claim 2 further comprising the steps:

said first bus master making subsequent data read requests; and predicting data elements to be read on each subsequent data read request from said first bus master.

5. The method of claim 1 wherein said predicting includes the step:

identifying the next sequential data element after a read request for a first data element.

6. The method of claim 5 wherein said first data element has an address, and wherein said identifying includes the step:

storing the address of said first data element.

7. The method of claim 6 wherein said identifying further includes the step:

providing a signal indicating the availability of storage space in said high speed cache memory.

8. The method of claim 7 wherein said high speed cache memory is sized to hold m data elements and wherein said signal is provided as long as less than m predicted data elements reside in said high speed cache memory.

9. The method of claim 7 wherein said identifying further includes the step:

incrementing said stored address to the address of said next sequential data element.

10. The method of claim 9 wherein said memory system is synchronized to a clock, said clock defining a plurality of clock cycles, and wherein said transferring includes the step:

monitoring said bus and transferring data elements on open cycles when said memory system is not being accessed by a bus master.

11. The method of claim 1 wherein said memory system includes a current address pointer for storing the address of the most recent data element read from said high speed cache memory, and a prefetch pointer for storing the address of the most recent data element transferred to said high speed cache memory, further comprising the steps:

comparing the contents of said pointers; and providing a signal indicating the availability of storage space in said high speed cache memory whenever said prefetch pointer is not one address behind said current address pointer.

12. A method for managing data elements in a memory system, said memory system being accessible by a host processor and at least one other bus master which are connected by a bus to said memory system, the method comprising the steps:

predicting sequential code data elements to be read after each read request by said host processor for a first data element; and transferring said predicted code data elements within said memory system from a slow memory to a high speed cache memory only when memory system access requests from said bus master will not be delayed;

wherein said high speed cache memory is sized to hold m data elements and wherein said predicting includes the steps:

storing the address of said first code element; and providing a signal indicating the availability of storage space in said high speed cache memory, said signal being provided as long as less than m predicted data elements reside in said high speed cache memory wherein said predicting further includes the steps:

incrementing said stored address to the address of said next sequential data element; and wherein said memory system is synchronized to a clock, said clock defining a plurality of clock cycles, and wherein said transferring includes:

monitoring said signal and said bus, and transferring the next sequential data element on an open cycle when said memory system is not being accessed by a bus master.

13. The method of claim 12 wherein said memory system includes a current address pointer for storing the address of the most recent data element read from said high speed cache memory, and a prefetch pointer for storing the address of the most recent data element transferred to said high speed cache memory, and wherein said signal is provided by the steps:

comparing the contents of said pointers; and generating said signal, as an indication of the availability of storage space in said high speed cache memory, whenever said prefetch pointer is not one address behind said current address pointer.

* * * * *

UNITED STATES PATENT AND TRADEMARK OFFICE
CERTIFICATE OF CORRECTION

PATENT NO. : 5,530,941
DATED : June 25, 1996
INVENTOR(S) : Pirmin L. Weisser et al.

It is certified that error appears in the above-indentified patent and that said Letters Patent is hereby corrected as shown below:

```
Column 8, line 11, after "comprising" insert --,after said
transferring step,--.
```

Signed and Sealed this

Twenty-fifth Day of February, 19

Attest:

BRUCE LEHMAN

*Attesting Officer*  *Commissioner of Patents and Trademarks*